United States Patent [19]

Spitzer

[11] Patent Number: 5,771,312
[45] Date of Patent: Jun. 23, 1998

[54] METHOD FOR AUTOMATIC PARTIAL WHITE BALANCE CORRECTION

[75] Inventor: Hedva Spitzer, Tel Aviv, Israel

[73] Assignee: Ramot University Authority For Applied Research & Industrial Development Ltd., Tel Aviv, Israel

[21] Appl. No.: 674,034

[22] Filed: Jul. 1, 1996

[51] Int. Cl.[6] .................................................... G06K 9/00
[52] U.S. Cl. ........................ 382/167; 358/516; 358/518
[58] Field of Search .................................. 382/162, 167, 382/191, 274; 358/515, 516, 518; 364/562

[56] References Cited

U.S. PATENT DOCUMENTS

| | | | |
|---|---|---|---|
| 5,144,442 | 9/1992 | Ginosar et al. | 358/209 |
| 5,247,366 | 9/1993 | Ginosar et al. | 358/209 |
| 5,609,978 | 3/1997 | Giorgianni et al. | 358/515 |

FOREIGN PATENT DOCUMENTS

| | | |
|---|---|---|
| 90/01750 | 2/1990 | WIPO . |
| 90/01844 | 2/1990 | WIPO . |

OTHER PUBLICATIONS

Wyszecki, et al, "Color Science", (Wiley 1982) pp. 139 & 615.
Dahari, R. et al, "Spatiotemporal Adaptation Model for Retinal Ganglion Cells", J. OPt. Soc. Am., vol. 13, No. 3, Mar. 1996, pp. 419–435.
Blackwell, K. et al, "Quantitative Studies of Color Consistency", J. Opt. So. Am., vol. 5, No. 10, Oct. 1988, pp. 1772–1780.
Courtney, S. et al, "Network Simulations of Retinal and Cortical Contributions to Color Constancy", Vision Res. vol. 35, No. 3 (1995) pp. 413–434.
Brainard, D. et al, "Asymetric Color Matching: How Color Appearance Depends on the Illuminant", J. Opt. So. Am., vol. 9, No. 9, (1992) pp. 1433–1448.
Rotgold, G. et al, "The Role of Remote Adaption in Perceived Subjective Color", no publication data.

*Primary Examiner*—Leo Boudreau
*Assistant Examiner*—Phuoc Tran
*Attorney, Agent, or Firm*—Mark M. Friedman

[57] ABSTRACT

A method for automatic partial correction of color images for non-white illumination. The images are processed in a manner similar to that by which the visual system processes signals related to color vision to achieve "color constancy".

21 Claims, 4 Drawing Sheets

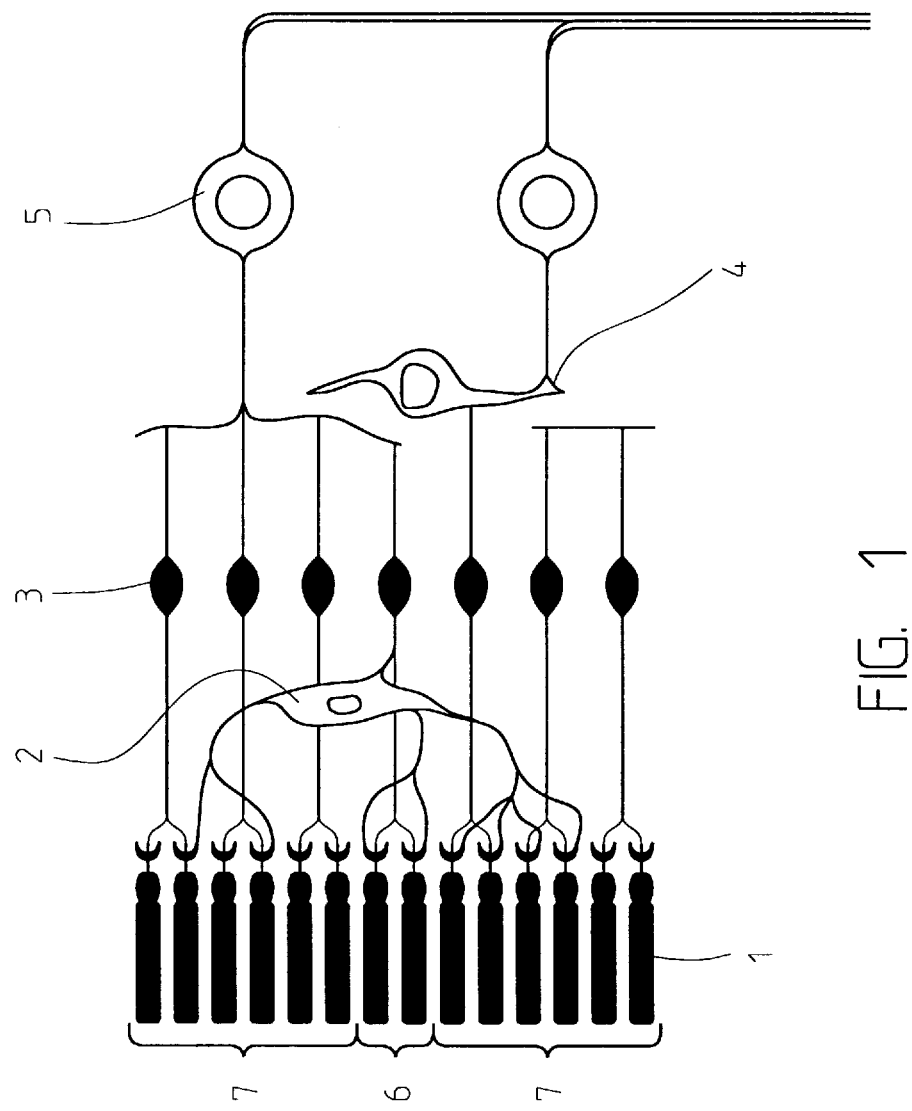

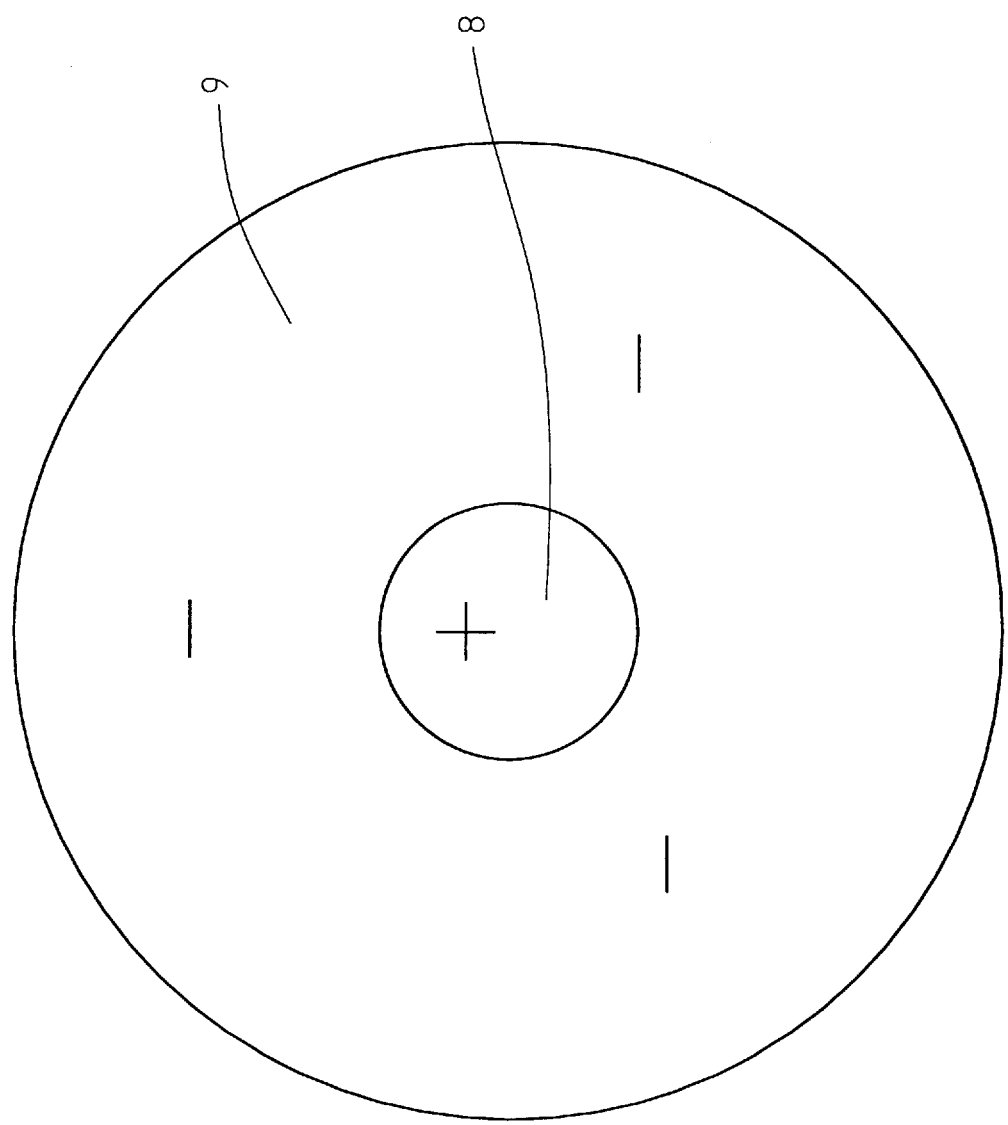

METHOD FOR AUTOMATIC PARTIAL WHITE BALANCE CORRECTION

FIELD AND BACKGROUND OF THE INVENTION

The present invention relates to image processing and, more particularly, to a method for partially correcting color images for colored illumination without knowledge of either the color or the intensity of the illumination.

The perceived colors of visible objects are determined, both by the physics of light reflection and by the way in which the visual system processes the reflected light that it receives. With regard to the physics, the physical color of the light reflected to the visual system by visible objects is determined, both by the reflectivity spectra of their surfaces, and by the color spectrum of the illuminating light. For an illuminated object to not appear dark, the illuminating light must include colors that the object reflects. For example, a red object looks red in light, such as red light or white light, whose spectrum includes a substantial red component, but looks dark in light, such as blue light, whose spectrum lacks a red component.

Through a physiological phenomenon called "color constancy", the visual system is capable of partially correcting perceived colors to compensate for colored illumination. For example, white sheets of paper look substantially white both at noon, when daylight is predominantly bluish, and at sunset, when daylight is predominantly reddish.

Photographs of scenes, including both still pictures and motion pictures, whether recorded by analog means (photographic film) or digital means (video cameras), normally are perceived differently from the way the scenes themselves would be perceived by direct vision. At least two means are known in the art for achieving "white balance", i.e., correcting for departures from whiteness of the illuminating light. Video cameras typically have manual means for achieving white balance. These means require that the video camera be aimed manually at a reference surface that is assumed to be white under white illumination, to record parameters related to the spectrum of the illumination so that the subsequently recorded pictures may be corrected for the non-whiteness of the illumination. Furthermore, the illumination spectrum may change suddenly, for example, if a cloud passes in front of the sun, or if the object being photographed moves from sunlight to shade. These changes in illumination degrade the accuracy of the white balance correction. More advanced video cameras often include automatic white balance mechanisms, but these are not entirely satisfactory.

There is thus a widely recognized need for, and it would be highly advantageous to have, a more satisfactory method for performing at least a partial white balance correction, either automatically or interactively, without knowing the illumination spectrum.

SUMMARY OF THE INVENTION

According to the present invention there is provided a method for partially correcting a scene for illumination color, the scene including an intensity spectrum at each of a plurality of pixels arranged in a rectangular grid, the method comprising the steps of: at each pixel: (a) multiplying the intensity spectrum by a spectral response function of a red photoreceptor, thereby providing a red spectral product; (b) multiplying the intensity spectrum by a spectral response function of a green photoreceptor, thereby providing a green spectral product; (c) multiplying the intensity spectrum by a spectral response function of a blue photoreceptor, thereby providing a blue spectral product; (d) integrating the red spectral product; (e) integrating the green spectral product; and (f) integrating the blue spectral product; thereby providing a red image, a green image, and a blue image, each image having a pixel value at each of the plurality of pixels.

The underlying concept of the present invention is to process color pictures in a manner similar to that in which the neurons of the visual system process signals related to color vision to achieve color constancy. Ideally, the input to the present invention is the intensity spectrum of a scene as a function of wavelength, measured at each pixel in a rectangular array of pixels. This intensity spectrum is multiplied by the spectral response function of each of the types of photoreceptor cells of the retina (red cones, green cones, and blue cones) to incident light, and integrated with respect to wavelength, thereby providing, at each pixel, a red intensity value, a green intensity value, and a blue intensity value. Collectively, the red values, the green values, and the blue values are examples of what is referred to herein as "images": rectangular arrays of values, one value per pixel. These values then are processed according to the algorithm of the present invention to provide images corrected for non-white illumination.

This ideal input rarely is attainable. Therefore, the scope of the present invention includes the processing of images obtained by other means. For example, the three input images may be in the form of analog signals from transducers whose spectral responses are similar to the spectral responses of cone cells, in which case the intensity values are electrical signals, typically voltage levels. These analog signals may be processed directly, using an embodiment of the present invention in analog hardware. Alternatively, these analog signals may be digitized, and processed digitally according to the present invention. Usually, however, the input to the present invention consists of digital images, such as are acquired by video cameras, that come ultimately from transducers whose spectral responses does not match the responses of cone cells. In that case, the digital pixel intensity values must be transformed to photoreceptor response coordinates, or "fundamentals", corresponding to the spectral responses of the three types of cones.

The most common color coordinate system for digital color images is the so-called red-green-blue, r-g-b, or chromaticity, coordinates. Digital images in other three-color schemes, such as yellow-cyan-magenta, may be transformed mathematically to r-g-b. The transformation from r-g-b coordinates, or from CIE x-y-z coordinates, to photoreceptor coordinates may be found, for example, in G. Wyszecki and W. S. Styles, "Color Science" (Wiley, 1982), pages 139 and 615. In what follows, all references to "red", "green" and "blue" will be to photoreceptor response coordinates, and not to chromaticity coordinates.

The present invention includes an algorithm in the spirit of that presented by Ronen Dahari and Hedva Spitzer in an article titled "Spatiotemporal adaptation model for retinal ganglion cells", published in the Journal of the Optical Society of America Series A, Volume 13 Number 3 (March 1996), which article is incorporated by reference for all purposes as if fully set forth herein. The paper by Dahari and Spitzer presents a model for the adaptation of visual perception to changing intensity of illumination. It has been conjectured that color constancy works by an analogous mechanism, with modifications as described herein.

FIG. 1 is a schematic cross section of the human retina, showing that the retina consists of five layers of cells, receptors 1, horizontal cells 2, bipolar cells 3, amacrine cells 4, and retinal ganglion cells 5. Receptors 1 shown here are rod cells, which respond to light intensity, rather than color. The mechanism of adaptation to changing intensity modeled by Dahari and Spitzer operates in achromatic retinal ganglion cells 5. The receptive field of achromatic ganglion cell 5 includes both receptors 6 of the center receptive field area and receptors 7 of the surround receptive field area. The responses of center area receptors 6 and surround area receptors 7 are combined in achromatic ganglion cell 5, in one of two different ways, depending on the type of achromatic ganglion cell 5. An "on-center" cell responds positively to signals of increased light intensity from the center area of the receptive field and negatively to signals of increased light intensity from the surround area of the receptive field. An "off-center" cell responds negatively to signals of increased light intensity from the center area of the receptive field and positively to signals of increased light intensity from the surround area of the receptive field.

The mechanism of color constancy is analogous, with two main modifications. The first is that color must be considered. There are six main groups of retinal ganglion cells 5 involved in color perception, corresponding to the three kinds of cone cells that respond to color analogously to the response of rod cells 1 to intensity. FIG. 2 shows schematically the receptive field processed by an on-center achromatic retinal ganglion cell 5, showing that the intensity response 9 from surround area rod cells 7 is subtracted from the intensity response 8 from center area rod cells 6. Similarly, a first group of on-center red-processing ganglion cells modifies the cell response of red light by subtracting green surround responses from red center responses; a second group of on-center green-processing ganglion cells modifies the cell response of green light by subtracting red surround responses from green center responses; and a third group of on-center blue-processing ganglion cells modifies the cell response of blue light by subtracting yellow surround responses, i.e., a combination of red surround responses and green surround responses, from blue center responses.

The second modification is that the perception of color is further modified by responses from "remote" areas of the receptive field that are even farther than the "surround" areas from the "center" areas. This is believed also to occur at the ganglion cell level.

The present invention imitates this mechanism of color perception to provide a partial automatic white balance correction for a color picture, under the assumption that the average scene imaged in the picture is "gray", i.e., that all three colors are of roughly equal intensities in the scene as a whole when viewed in white light. Corrections corresponding to those performed in the retinal ganglion layer are performed computationally to the three intensity images that constitute the picture.

BRIEF DESCRIPTION OF THE DRAWINGS

The invention is herein described, by way of example only, with reference to the accompanying drawings, wherein:

FIG. 1 is a schematic cross section of a human retina;

FIG. 2 is a schematic diagram of the receptive field of one achromatic retinal ganglion cell;

DESCRIPTION OF THE PREFERRED EMBODIMENTS

Figure 3A:
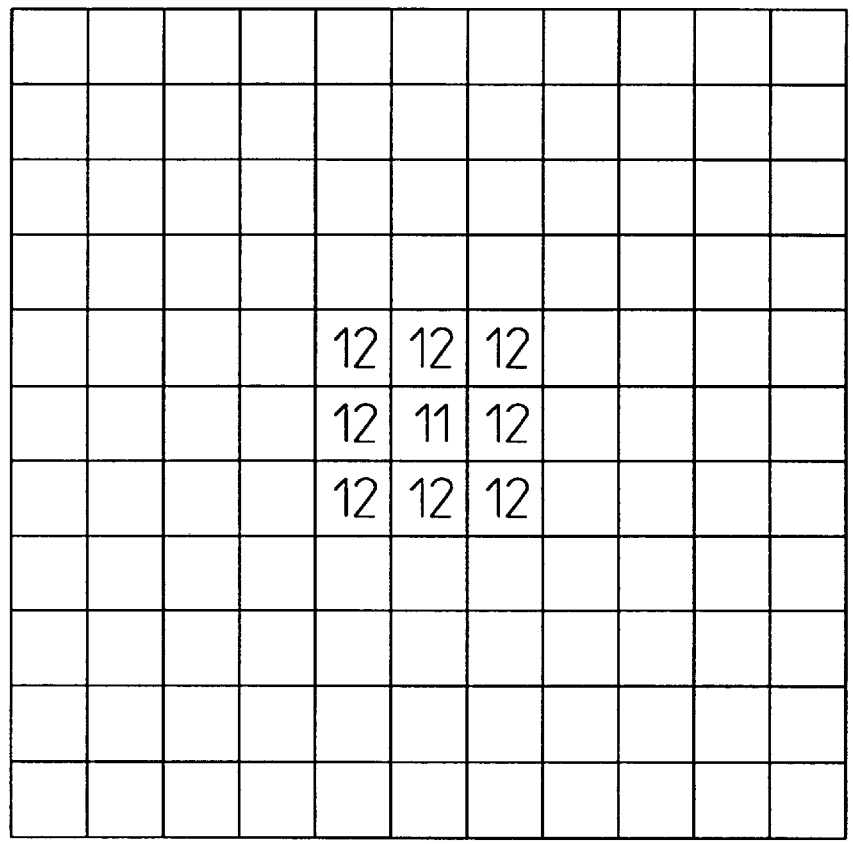
FIG. 3A shows a typical range of pixels included in the "surround" convolutions.

The present invention is of a method of emulating the color constancy mechanism of visual perception. Specifically, the present invention can be used to perform a partial automatic "white balance" correction of color pictures without knowledge of the illumination spectrum.

The principles and operation of a "white balance" correction method according to the present invention may be better understood with reference to the drawings and the accompanying description.

The present invention attempts to treat the input red, green, and blue intensity values as though they were the responses of red, green and blue cone cells. The method transforms those values into a "response image" in a manner similar to that by which an on-center retinal ganglion cell responds to inputs from cone cells, infers what that response image would be if the average scene were gray, and inverts the transformation to produce corrected images. It is to be understood that references to an "image" herein are references to values at pixels, or "pixel values", treated collectively, as an array. Thus, the term "image" as used herein includes purely mathematical objects, and does not necessarily correspond to a physical image, although the original input images certainly do correspond to physical images. The forward transformation is performed analogously to the top path of FIG. 1 of Dahari and Spitzer, to provide, at each pixel, a red center response, a green center response, and a blue center response, with an additional consideration of a remote correction, as described herein. These responses are corrected for the non-whiteness of the input images, and then inverted by following the top path of FIG. 1 of Dahari and Spitzer backwards. In some preferred embodiments of the present invention, a forward transformation analogous to the bottom path of FIG. 1 of Dahari and Spitzer is performed on the red and green images, to provide, at each pixel, a red surround response and a green surround response, again, with an additional consideration of a remote correction, as described herein. These surround responses are subtracted from the center responses, in emulation of the action of "on-center" retinal ganglion cells, as follows: the green surround response is subtracted from the red center response; the red surround response is subtracted from the green center response; and the red surround response and the green surround response are averaged to form a yellow response, which is subtracted from the blue center response. The resulting modified center responses are inverted in the same way as in embodiments in which this surround correction is not performed.

This procedure for combining center responses with surround responses tends to blur the edges between regions of strongly contrasting color. This blurring may be removed by further processing, in emulation of the action of the "double opponent" cells of the visual cortex. These cells combine the responses of the on-center and off-center retinal ganglion cells in a manner that resembles a mathematical second derivative. For example, one type of double opponent cell gets its (new) center response from the first group of on-center ganglion cells (the group that subtracts green surround responses from red center responses), and gets its (new) surround response from a corresponding group of off-center cells, the group that subtracts red center responses from green surround responses. To emulate the action of these double opponent cells, it is necessary first to transform the input images to response images corresponding to the actions of both on-center retinal ganglion cells and off-center retinal ganglion cells.

This can be done in more than one way. For example, the action of the type of double opponent cell described above can be emulated by assigning the emulated response of the first group of on-center ganglion cells to the new center response, and assigning the emulated response of a corresponding group of off-center cells to the new surround response. Alternatively, the second part of this action can be emulated by assigning the negative of the emulated response of the first group of on-center ganglion cells to the new surround response.

As in Dahari and Spitzer, the first step of the present invention is the transformation of each input image to an "output function" G. For each color, there is a center output function $G_c$ and a surround output function $G_s$. Each of the three center output functions $G_c$ is computed by convolving the corresponding color image with a center local spatial Gaussian filter, as shown in equations 2 and 3 of Dahari and Spitzer, thereby producing a center smoothed image whose pixel values are the required $G_c$'s. Similarly, each of the three surround output functions $G_s$ is computed by convolving the corresponding color image with a surround local spatial Gaussian filter, thereby producing a surround smoothed image whose pixel values are the required $G_s$'s. Typical values of the radii p of the Gaussian filters are 0.5 pixels for the center filter and 1.5 pixels for the surround filter.

Optionally, the pixel values may be normalized before the spatial filtering with the Gaussian filters:

$$p := p/(p+p_0)$$

wherein p represents a pixel value, $p_0$ is a normalization constant, and ":=" represents replacement.

Also as in Dahari and Spitzer, the present invention computes a response R at each pixel from the corresponding output function, using a Naka-Rushton-like equation. Unlike Dahari and Spitzer, the Naka-Rushton equation of the present invention has two semisaturation terms in the denominator. For each color, the center response in terms of the center output function $G_c$ is $$R_c = G_c/(G_c + \sigma_{c,1} = \sigma_{c,r})$$

and the surround response in terms of the surround output function $G_s$ is $$R_s = G_s/(G_s + \sigma_{s,1} = \sigma_{s,r})$$

$\sigma_{c,1}$ is a center local semisaturation term, similar to the semisaturation term defined in Dahari and Spitzer, equation 9. $\sigma_{c,r}$ is a color center remote semisaturation term that embodies the modification of the "center" response due to the "remote" response. Similarly, $\sigma_{s,1}$ is a surround local semisaturation term, and $\sigma_{s,r}$ is a color surround remote semisaturation term that embodies the modification of the "surround" response due to the "remote" response.

In the preferred embodiments of the present invention in which surround responses are subtracted from center responses, this subtraction is done at this point. Specifically, $R_{c,red} := R_{c,red} - R_{s,green}$ $R_{c,green} := R_{c,green} - R_{s,red}$ $R_{c,blue} := R_{c,blue} - (R_{s,red} + R_{s,green})12$ Then, whether or not the center responses are adjusted by this subtraction, the correction for the non-whiteness of the scene is accomplished by substituting a white remote semisaturation term $\sigma_w$ for $\sigma_{c,r}$ and solving for a corrected output function $H_c$ in terms of $R_c$:

$$H_c = R_c(\sigma_{c,1} + \sigma_w)/(1-R_c)$$

Preferably, the same $\sigma_w$ is used at all pixels of all three colors. This common $\sigma_w$ is computed, either by averaging all the $\sigma_{c,r}$'S of all three colors, or through the CIE standard scotopic observer (Wyszecki and Styles, page 256, table 1(4.3.2)).

The forward transformation is inverted by deconvolving $H_c$ with respect to the center spatial Gaussian filter that is used to produce $G_c$. If the optional step of normalizing the pixel values before spatial filtering was taken, it must be undone at this point:

$$p := pp_0/(1-p)$$

The form of the method of the present invention is simpler when applied to still photography, because time variation may be ignored. The method for computing the output functions and the semisaturation terms for still photography now will be described.

The center local semisaturation term is computed as $$\sigma_{c,1} = \alpha_c G_c + \beta_c$$

where $\alpha_c$ and $\beta_c$ are constant parameters. Similarly, the surround local semisaturation term is computed as $$\sigma_{s,1} = \alpha_s G_s + \beta_s$$

where $\alpha_s$ and $\beta_s$ are constant parameters. A typical value of both $\alpha_c$ and $\alpha_s$ is between 1 and 2. A typical value of both $\beta_c$ and $\beta_s$ is between 0.01 and 0.2.

The remote semisaturation terms are computed by convolving the corresponding output functions with spatial exponential filters, thereby producing "remote images" whose pixel values are the required remote semisaturation terms. Specifically, at a pixel with spatial coordinates (x,y), the center remote semisaturation term is obtained from a convolution of $G_c$ with a center remote spatial exponential filter:

$$\sigma_{c,r} = \gamma_c \int\int G_c(x',y') \exp(-r(x-x',y-y')/\lambda_c) \, dx'dy'$$

and the surround remote semisaturation term is obtained from a convolution of $G_s$ with a surround remote spatial exponential filter:

$$\sigma_{s,r} = \lambda_s \int\int G_s(x',y') \exp(-r(x-x',y-y')/\lambda_2) \, dx'dy'$$

where, in both spatial exponential filters, r(x,y) is Euclidean distance:

$$r(x,y) = sqrt(x^2+y^2)$$

A typical value of the constant parameters $\gamma_c$ and $\gamma_s$ is between 1 and 3. A typical value of the radii $\lambda_c$ and $\lambda_s$ is two-thirds of a linear dimension of the image, measured in numbers of pixels.

Figure 3B:
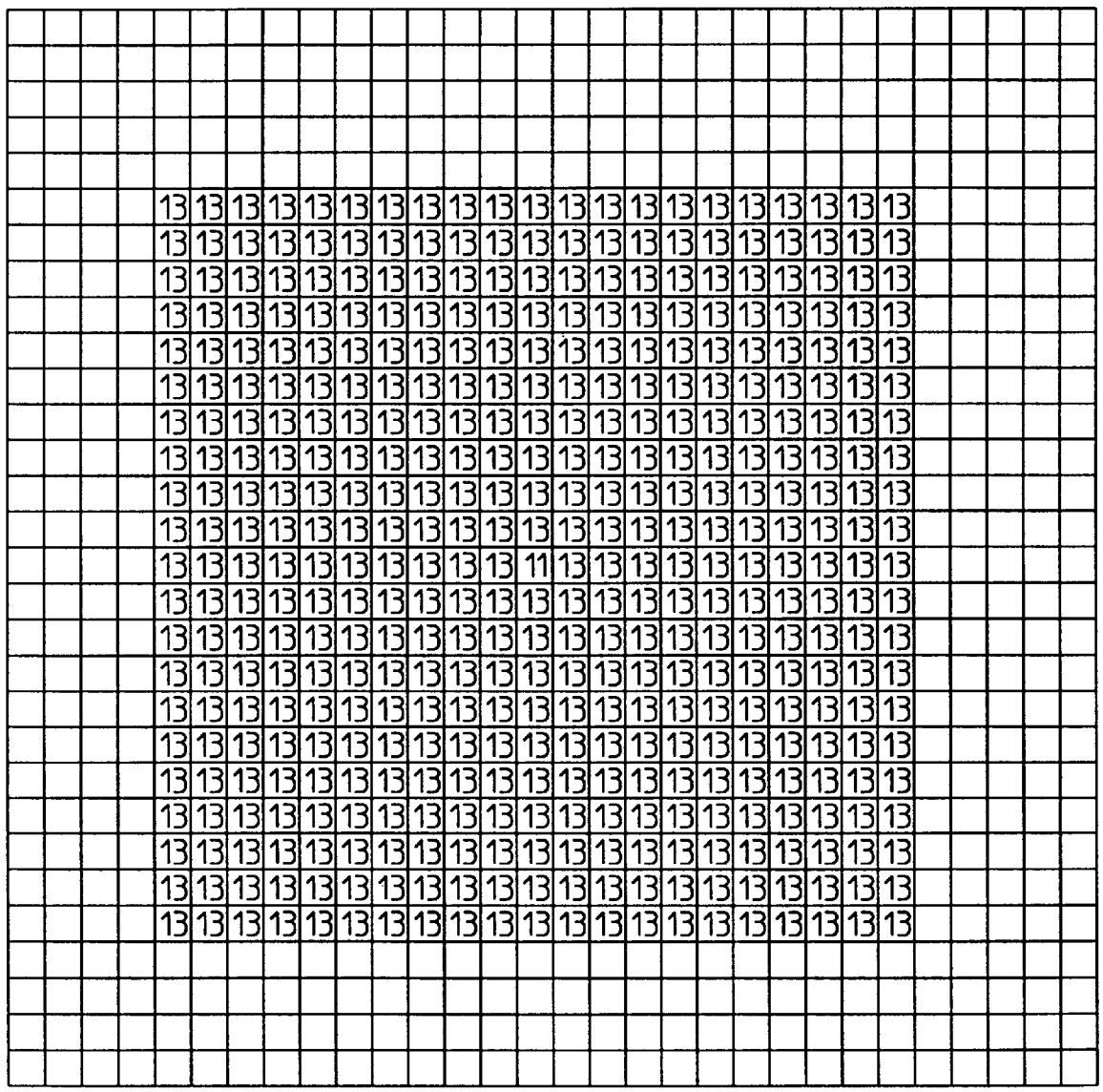
FIG. 3B shows a typical range of pixels included in the "remote" convolutions.

As can be understood from the subscripts "c" (center), "s" (surround), and "r" (remote), the various spatial convolutions extend over different numbers of pixels. The convolution for computing $G_c$ typically extends over one pixel, i.e., that "convolution" actually is a multiplication. Typical domains for the other convolutions are shown in FIGS. 3A and 3B. The domain of the convolution for computing $G_s$ is shown in FIG. 3A. That convolution typically extends over eight pixels 12 immediately surrounding a target pixel 11, as shown in FIG. 3A, but may include the 16 pixels immediately surrounding those eight pixels, thereby extending over a total of 24 pixels. The domain of the convolutions for computing the remote semisaturation terms $\sigma_{c,r}$ and as $\sigma_{s,r}$ typically extend over about half the image, but may extend over as few as the 24 pixels that are the maximum for the "surround" convolution. For example, a typical remote semisaturation domain for a 30×30 (900 pixel total) image is shown in FIG. 3B: 440 pixels 13 surrounding target pixel 11. At the boundaries of the images, all convolutions use periodic boundary conditions.

The form of the method of the present invention that is applied to digital video photography takes time variation into account, in a manner similar to that of the model of Dahari and Spitzer. The output functions $G_s$ and $G_s$ now are functions of time t, because the images they are created from vary in time. In addition to the spatial filters defined above, which are applied to entire images at a single value of t, temporal filters, as defined below, are applied pixel-wise to these functions of t. Two kinds of temporal filters are used: temporal low pass filters, which are independent of the functions to which they are applied, and adaptive temporal filters, which depend, at any given time t, on the prior history of the functions to which they are applied. $G_c(t)$ and $G_s(t)$ are convolved with corresponding low-pass temporal filters as shown in equations 4 and of Dahari and Spitzer. A typical values of the low-pass temporal filter time constants, $\tau_c$ for the center low-pass temporal filter convolved with $G_c$, and $\tau_s$ for the surround low-pass temporal filter convolved with $G_s$, is 20 milliseconds. Second, center and surround adaptive functions $G_{c,b}(t)$ and $G_{s,b}(t)$, analogous to Dahari and Spitzer's adapting component $G_b(t)$, are used in the computation of the semisaturation terms $\sigma_{c,1}$ and $\sigma_{s,1}$ which now also are functions of t:

$$\sigma_{c,1}(t) = \alpha_c G_{c,b}(t) + \beta_c$$

$$\sigma_{s,1}(t) = \alpha_s G_{s,b}(t) + \beta_s$$

These adaptive functions are computed by convolving the corresponding output functions with corresponding adaptive temporal filters as shown in equations 7 and 8 of Dahari and Spitzer, and in the boxes labeled "dynamical adaptive filter" in FIG. 1 of Dahari and Spitzer. What makes these filters adaptive is that the associated time "constants" actually are functions of both time and the prior histories of $G_c$ and $G_s$. Suppressing the subscripts "c" and "s" for clarity, the most preferred form of the function $\tau_b$ that describes the decay of the adaptive filter is:

$$\tau_b(t) = \tau_m / (1 + \text{abs}(G(t) + G_b(t))/G_n)$$

In this expression, $\tau_m$ is the maximum expected value of $\tau_b(t)$, $G(t)$ is the output function, $G_c$ or $G_s$, after convolution with the corresponding low-pass temporal filter; $G_b(t)$ is the corresponding adaptive function, $G_{c,b}(t)$ or $G_{s,b}(t)$, i.e., the output of the convolution, at times prior to the time at which the convolution presently is being computed; and $G_n$ is a normalization constant. Because the adaptive filter is causal, it is well-defined despite being defined in terms of its own output.

Time variation is taken into account while inverting the transformation, by deconvolving $H_c$ with respect to the center low-pass temporal filter with which $G_s$ is convolved, before deconvolving $H_c$ with respect to the center spatial Gaussian filter.

While the invention has been described with respect to a limited number of embodiments, it will be appreciated that many variations, modifications and other applications of the invention may be made.

What is claimed is:

1. A method for partially correcting a scene for illumination color, the scene including an intensity spectrum at each of plurality of pixels arranged in a rectangular grid, the method comprising, the steps of:
   (a) at each pixel:
      (i) multiplying the intensity spectrum by a spectral response function of a red photoreceptor, thereby providing a red spectral product,
      (ii) multiplying the intensity spectrum by a spectral response function of a green photoreceptor, thereby providing a green spectral product,
      (iii) multiplying the intensity spectrum by a spectral response function of a blue photoreceptor, thereby providing a blue spectral product,
      (iv) integrating said red spectral product,
      (v) integrating said green spectral product, and
      (vi) integrating, said blue spectral product, thereby providing a red image, a green image, and a blue image, each image having a pixel value at each of the plurality of pixels,
   (b) for each image:
      (i) transforming the image to a center remote image, and
      (ii) combining the image with said center remote image to produce, at each pixel, a center response, $R_c$, thereby producing, at each pixel, a center red response, a center green response, and a center blue response; and
   (c) for each image: for each pixel: correcting said center response for non-whiteness of said center remote images.

2. The method of claim 1, wherein:
   (a) said step of transforming the image to a center remote image is done by steps including:
      (i) convolving the image with a center local spatial filter, thereby producing a center smoothed image constituting, at each pixel, a center output function $G_6$,
      (ii) convolving said center smoothed image with a center remote spatial filter, thereby producing, at each pixel, a center color remote semisaturation term, $s_{c,r}$,
      (iii) for each pixel,
         (A) selecting a first parameter, $g_c$, and
         (B) multiplying said center color remote semisaturation term by said $g_c$;
   (b) said step at combining the image with said center remote image is done by steps including: for each pixel:
      (i) selecting a second parameter, $a_c$,
      (ii) selecting a third parameter $b_c$,
      (iii) setting a center local semisaturation term, $s_{c,l}$, equal to $$a_c G_{c,b} + b_c$$

where $G_{c,b}$ is a centers adaptive function
      (iv) setting said center response equal to $$G_c / (G_c + s_{c,l} + s_{c,r}); \text{ and}$$

(c) said step of correcting said center response for non-whiteness of said center remote images is done by steps including:
      (i) combining said center remote images to produce, at each pixel, a white remote semisaturation term, $s_w$,
      (ii) for each pixel, setting a center corrected output function, $H_c$, equal to $$R_c (s_{c,l} + s_w) / (1 - R_c),$$

thereby producing a corrected smooth image constituting, at each pixel, said $H_c$;

the method further comprising the step of: for each image, deconvolving said corrected smooth image with respect to said center local spatial filter.

3. The method of claim 2, wherein said center local spatial filter is a Gaussian filter.

4. The method of claim 2, wherein said center remote spatial filter is an exponential filter.

5. The method of claim 2, wherein said step of convolving the image with said center local spatial filter is preceded by the step of replacing each pixel value, p, with $p/(p+p_0)$, where said $p_0$ is a normalization constant; and wherein said step of deconvolving said corrected smooth image with respect to said center local spatial filter is followed by undoing said step of replacing p.

6. The method of claim 2, wherein said center adaptive function is identical to said center output function.

7. The method of claim 2, further comprising the steps of: for each image: for each pixel:
(a) convolving said center output function with a center low-pass temporal filter;
(b) setting said center adaptive function equal to a convolution of a center adaptive filter with said center output function; and
(c) deconvolving said corrected output function with respect to said center low-pass temporal filter.

8. The method of claim 7, wherein said center adaptive filter has a center decay time function, $\tau_{c,b}$.

9. The method of claim 8, wherein said center decay time function is $$\tau_{c,b} = \tau_{c,m}/(1+abs(G_{8a}-G_c)/G_{c,n})$$

where $\tau_{c,m}$ is an expected maximum value of said center decay time function, where $G_{8a}$ is said center output function after said step of convolving with said center low-pass temporal filter, and where $G_{c,n}$ is a normalization constant.

10. The method of claim 2, wherein said step of combining said center remote images is done by setting each of said white remote semisaturation terms equal to an average of all of said center color remote semisaturation terms.

11. The method of claim 2, wherein said step of combining said center remote images is done through the CIE standard scotopic observer.

12. The method of claim 1, further comprising the steps of:
(a) for the red image and the green image:
(i) transforming the image to a surround remote image, and
(ii) combining the image with said surround remote image to produce, at each pixel a surround response, $R_s$, thereby producing a surround red response and a surround green response, and
(b) for each pixel:
(i) subtracting said surround green response from said center red response,
(ii) subtracting said surround red response from said center green response,
(iii) combining said surround red response and said surround green response, thereby providing a yellow response, and
(iv) subtracting said yellow response from said center blue response.

13. The method of claim 12, wherein:
(a) said step of transforming the image to a surround remote image is done by steps including:
(i) convolving the image with a surround local spatial filter, thereby producing a surround smoothed image constituting, at each pixel, a surround output function, $G_s$,
(ii) convolving said surround smoothed image with a surround remote spatial filter, thereby producing, at each pixel, a surround color remote semisaturation term, $\sigma_{s,r}$,
(iii) for each pixel,
(A) selecting a fourth parameter, $\gamma_s$, and
(B) multiplying said surround color remote semisaturation term by said $\gamma_s$; and
(b) said step of combining the image with said surround remote image is done by steps including: for each pixel:
(i) selecting a fifth parameter, $\alpha_s$,
(ii) selecting a sixth parameter, $\beta_s$,
(iii) setting a surround local semisaturation term, $\sigma_{s,l}$, equal to $$\alpha_s G_{s,b} + \beta_s$$

where $G_{s,b}$ is a surround adaptive function,
(iv) setting said surround response equal to, $$G_s/(G_s+\sigma_{s,l}+\sigma_{s,r}).$$

14. The method of claim 13, wherein said surround local spatial filter is a Gaussian filter.

15. The method of claim 13, wherein said surround remote spatial filter is an exponential filter.

16. The method of claim 13, wherein said step of convolving the image with said surround local spatial filter is preceded by the step of replacing each pixel value, p, with $p/(p+p_0)$, where said $p_0$ is a normalization constant.

17. The method of claim 13, wherein said surround adaptive function is identical to said surround output function.

18. The method of claim 13, further comprising the steps of: for each image: for each pixel:
(a) convolving said surround output function with a surround temporal low-pass filter; and
(b) setting said surround adaptive function equal to a convolution of a surround adaptive filter with said surround output function.

19. The method of claim 18, wherein said surround adaptive filter has a surround decay time function $\tau_{s,b}$.

20. The method of claim 19, wherein said surround decay time function is $$\tau_{s,b} = \tau_{s,m}/(1+abs(G_{19a}-G_s)/G_{s,n})$$

where $\tau_{s,m}$ is an expected maximum value of said surround decay time function, where $G_{19a}$ is said surround output function after said step of convolving with said surround low-pass temporal filter, and where $G_{s,n}$ is a surround normalization constant.

21. The method of claim 12, wherein said step of combining said surround red response and said surround green response is done by averaging said surround red response and said surround green response.

* * * * *

UNITED STATES PATENT AND TRADEMARK OFFICE
CERTIFICATE OF CORRECTION

PATENT NO. : 5,771,312
DATED : June 23, 1998
INVENTOR(S) : Hedva Spitzer

It is certified that error appears in the above-identified patent and that said Letters Patent is hereby corrected as shown below:

In line 37, change $G_6$ to $G_c$

Signed and Sealed this

Twenty-sixth Day of January, 1999

Attest:

*Attesting Officer*     *Acting Commissioner of Patents and Trademarks*